April 7, 1953          J. D. DALES          2,633,862

WATER FAUCET

Filed July 10, 1947

Inventor.
John D. Dales
by Douglas S. Johnson
Agent.

Patented Apr. 7, 1953

2,633,862

UNITED STATES PATENT OFFICE 2,633,862

WATER FAUCET

John D. Dales, Toronto, Ontario, Canada, assignor of twenty-two and two-ninths to William Clifton A. Howell, twenty-two and two-ninths to Oswald Morrison Taylor, both of Toronto, Ontario, and twenty-two and two-ninths to Albert H. Beaulne, Montreal, Quebec, Canada Application July 10, 1947, Serial No. 760,135
In Canada July 11, 1946

3 Claims. (Cl. 137—390)

This invention relates to improvements in water facets for use in wash basins, sinks and other places where faucets are required for controlling the flow of water or other fluids and the principal object of the invention is to provide a structure which will permit of the easy and rapid removal and replacement of the valve seat or washer without the necessity of providing a separately operated valve or tap to shut off the flow while the valve seat is being removed, thereby greatly reducing the initial cost of faucet installations.

A further object is to provide a faucet which in the event of the spindle and cap being removed in error will automatically close and prevent flooding.

A still further object is to provide a faucet in which the valve seat may rotate with the spindle in the closing operation and thus reduce the wear through continued use.

The principal feature of the invention consists in providing a secondary valve seat on the inward or pressure side of the regular valve seat and arranging a floating valve to close against said secondary seat through the pressure flow of fluid through the faucet, the valve spindle having an extension to engage said pressure closing valve to hold it clear of its seat during the normal operation of opening and closing the faucet but which will, under excessive opening movement of the spindle, allow the floating valve to close against the secondary seat and shut off the flow of fluid.

Figure 1:
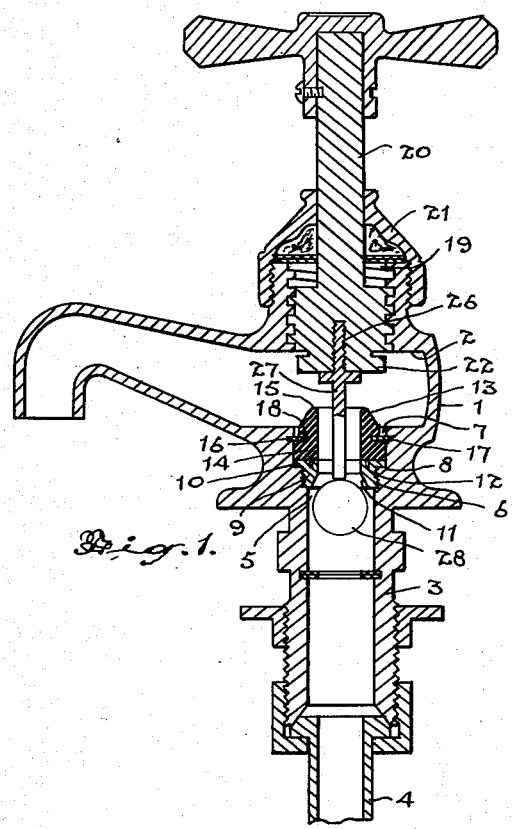
Figure 1 is a vertical mid-sectional view of the preferred form of my improved faucet showing the fluid control valve open to allow the flow of fluid therethrough.
Figure 2:
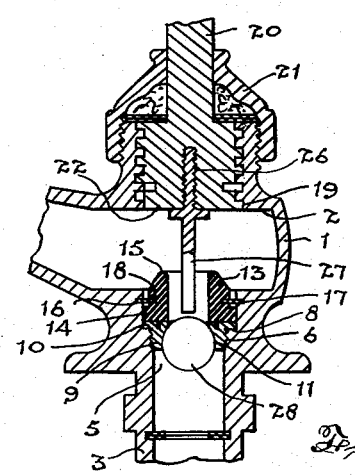
Figure 2 is a partial sectional view showing the fluid control valve closed.
Figure 3:
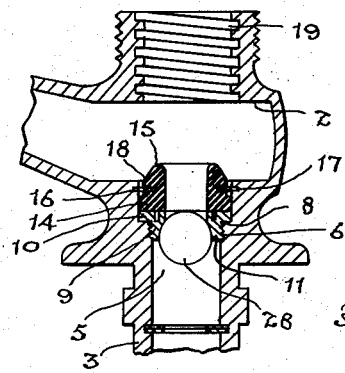
Figure 3 is a partial sectional view of the valve with the spindle removed.

In the ordinary faucet construction the spindle is provided with an inverted cup recess in which a washer is arranged to engage a permanent seat formed in the body of the faucet and when the washer wears out it is necessary to shut off the water pressure either at a main shut-off valve or an extra shut-off valve arranged in the local branch pipe leading to the faucet.

In the present invention the body 1 of the faucet is formed with a central chamber 2 and a tubular portion 3 extending downwardly to be connected to the fluid supply pipe 4.

The upper end of the tubular portion 3 is provided with a cylindrical chamber 5 which is formed adjacent to its upper end with a threaded counterbore 6 and an enlarged counterbore 7 forming a shoulder 8.

An externally threaded ring 9 is threaded into the threaded counterbore 6 and is provided with a flange 10 which engages the shoulder 8. The inner end of the ring 9 is formed with a tapered or part spherical seat 11. This ring is also provided with suitable spanner holes 12 in its upper face so that a stud spanner may be inserted therein for assembling the ring in position, or the central orifice may be of hexagonal or other flat-faced formation to be engaged by a suitable tool for screwing the ring into place.

A resilient valve seat 13 here shown of annular form and preferably made of a flexible compressible material such as rubber, or "neoprene" is provided with a bottom flange 14 which will seat upon the upper face of the flanged ring 9. The seat 13 preferably converges inward in a suitable contour to form a rounded seating surface 15.

The ring-shaped seat 13 resting on the ring 9 is here shown held in place by a split spring ring 16 which fits into an annular recess 17 in the side wall of the counterbore 7 and engages a similar annular recess 18 in the seat 13.

The combination of the flexible valve seat and the split spring ring enables the easy assembly of the valve seat in position and when assembled it will not become displaced through the normal operations but may be easily removed and replaced.

The upper structure of the faucet body 1 above the chamber 2 is formed with a threaded recess 19 to receive the threaded portion of the valve spindle 20 and this recess is closed by a threaded cap 21 through which the reduced upper end of the spindle extends. The inward end of the spindle is formed with a flat flange 22 the face of which is adapted to engage the valve seat 13 to close the fluid passage. It will be understood that as this flange engages the valve seat in its closing movement, the seat will turn with the spindle and the compressible seat will make an excellent seal against the flange as it is compressed between the flange and ring 9.

Figure 4:
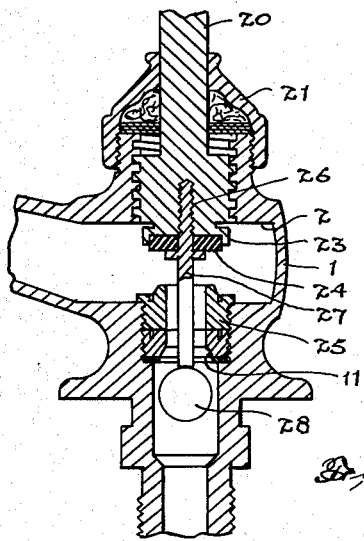
Figure 4 is a partial sectional view showing a modified form of spindle valve and seat.

If desired, the spindle flange for engaging the valve seat may be formed with a cupped recess 23 to receive a washer 24 and when such is provided the valve seat may be made of metal as shown in Figure 4. This valve seat 25 will be threaded into a threaded counterbore in the valve body.

The spindle 20 is provided with a centrally threaded recess 26 in its inward end in which is threaded a stem 27 which extends downwardly through the central orifices of the valve seats 9 and 13 or 25.

Within the cylindrical chamber 5 of the faucet body is arranged a floating valve 28 here shown of spherical form which is adapted to engage the seat 11 of the ring 9. This valve is however normally engaged by the end of the stem 27 and held from contact with the seat 11 as the spindle 20 is operated in its opening and closing movement. If however the spindle 20 is raised to an abnormal position it will raise the stem 27 sufficiently high to permit the valve 28 to close and shut off the fluid flow. When the spindle is thus operated the cap and spindle may be removed to permit the changing of the valve seat 13 or 25 or the washer 24.

When the washer or valve seat has been replaced and the spindle and cap have been returned to position the turning of the spindle in its thread will cause the stem 27 to engage the valve 28 and move it clear of its seat thus allowing the faucet to function normally.

Figure 5:
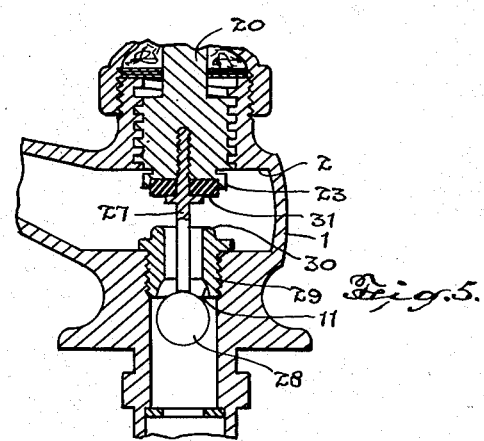
Figure 5 is a partial sectional view showing a further modified form of valve seat.

It may be found desirable for some purposes to provide a faucet with a permanent valve seat and dispense with the extra element in the form of the ring 9. In such instance the valve seat may be formed as shown in Figure 5 of a single annular threaded member 29 which is provided with an upper seat 30 to co-operate with the spindle and a lower seat 31 to co-operate with the floating valve. Such an arrangement will permit of the removal of the spindle for the changing of a washer while the floating valve closes the lower seat but it will not permit of the changing of the seat member 29.

In some instances it may be found desirable to form the seat for the floating valve a permanent part of the body structure. If so the seat may be cast integral with the body and machined from the lower end. When such an arrangement is desired it will be necessary to provide a means for retaining the floating valve within the lower chamber which can be accomplished by inserting a suitable retainer ring as shown in Figure 5.

It will be understood that the arrangement of the floating valve as described will enable ready access to the washer and valve seats at all times by simply manipulating the regular operating spindle.

What I claim as my invention is:

1. A faucet having a central chamber and a chamber extending from one side thereof and formed with a threaded counterbore, a spindle threaded in said faucet in opposite arrangement to said extension chamber, a threaded ring threaded in said counterbore and forming a valve seat at the side remote from said spindle, a float valve in said extension chamber adapted to co-operate with said valve seat, a resilient ring mounted in said counterbore above and seating on the aforesaid threaded ring and forming a valve seat at the side adjacent said spindle and against which said spindle is adapted to close, an annular groove formed in said resilient valve seat ring and in the wall of said counterbore, annular spring key means entered in said annular grooves anchoring said valve seat ring against accidental displacement from said counterbore and supporting said resilient valve seat ring for rotative movement upon engagement by and under pressure of said spindle to engage and compress said resilient valve seat ring between said spindle and said threaded valve seat ring, and an extension from said spindle adapted to engage said float valve and hold same from seating on said threaded ring upon normal spindle operation to open and to close said resilient valve seat and compress same against said threaded ring.

2. A faucet having a central chamber and a chamber extending from one side thereof and formed with a threaded counterbore, a spindle threaded in said faucet in opposite arrangement to said extension chamber, a threaded metal ring threaded in said threaded counterbore and forming a valve seat at the side remote from said spindle, a ball valve in said extension chamber adapted to co-operate with said valve seat, a ring of flexible and compressible material mounted in said counterbore above and supported on the aforesaid threaded ring and forming a valve seat at the side adjacent said spindle and against which said spindle is adapted to close, registering annular grooves formed in the periphery of said compressible ring and the wall of said counterbore, a split spring ring engaging in said annular grooves anchoring said resilient ring against accidental displacement from said counterbore while supporting said resilient ring for rotative movement upon engagement by and under pressure of said spindle to compress same against said threaded ring forming a rigid stop, and an extension from said spindle adapted to engage said ball valve and normally hold same from seating on said threaded ring and as said spindle compresses said compressible valve seat ring against said threaded ring.

3. In a faucet having a valve chamber and a threaded spindle in opposite arrangement to said valve chamber, said valve chamber being formed with a threaded counterbore, a threaded ring threaded to the bottom of said counterbore and having the face remote from said spindle formed to provide a valve seat, a ring of flexible compressible material and formed with an annular peripheral groove seated on said threaded ring in said counterbore having its face adjacent said spindle formed to provide a valve seat against which said spindle is adapted to close, said counterbore being formed with an annular groove registering with the groove of said compressible ring when seated on said threaded ring, an annular split spring ring extending into said grooves to maintain said compressible ring in said counterbore and supporting said compressible ring for rotation upon engagement by said spindle to seal said second-mentioned valve seat and valve chamber, an auxiliary float valve adapted to co-operate with said first-mentioned valve seat, and means carried by said spindle adapted to engage and hold said float valve from its valve seat during normal movement of said spindle between a position opening the faucet and a position compressing said compressible valve seat ring against said threaded valve seat ring.

JOHN D. DALES.

REFERENCES CITED

The following references are of record in the file of this patent:

UNITED STATES PATENTS

| Number | Name | Date |
|---|---|---|
| 571,833 | Hunter | Nov. 24, 1896 |
| 775,929 | O'Mear | Nov. 29, 1904 |
| 1,082,988 | Wolff | Dec. 30, 1913 |
| 1,787,445 | Gade | Jan. 6, 1931 |
| 2,348,548 | Koehler | May 9, 1944 |

FOREIGN PATENTS

| Number | Country | Date |
|---|---|---|
| 49,363 | France | Mar. 24, 1939 |
| 270,101 | Great Britain | of 1927 |